(12) United States Patent
Bartetzko et al.

(10) Patent No.: US 12,154,195 B2
(45) Date of Patent: Nov. 26, 2024

(54) VISUALIZATION OF RELATIONSHIPS AMONG ORDER COMPONENTS

(71) Applicant: SAP SE, Walldorf (DE)

(72) Inventors: Camil Bartetzko, Walldorf (DE);
Bernhard Teltscher, Speyer (DE);
Tingyi Liu, Walldorf (DE); Babu Ganesh V, Walldorf (DE); Julia Weidenbruch, Plankstadt (DE)

(73) Assignee: SAP SE, Walldorf (DE)

( * ) Notice: Subject to any disclaimer, the term of this patent is extended or adjusted under 35 U.S.C. 154(b) by 246 days.

(21) Appl. No.: 17/452,598

(22) Filed: Oct. 28, 2021

(65) Prior Publication Data
US 2023/0136334 A1   May 4, 2023

(51) Int. Cl.
*G06T 11/20* (2006.01)
*G06F 16/9038* (2019.01)
*G06T 11/00* (2006.01)

(52) U.S. Cl.
CPC ........ *G06T 11/206* (2013.01); *G06F 16/9038* (2019.01); *G06T 11/001* (2013.01); *G06T 2200/24* (2013.01)

(58) Field of Classification Search
None
See application file for complete search history.

(56) References Cited

U.S. PATENT DOCUMENTS

| 9,992,219 B1 * | 6/2018 | Hamlet | H04L 63/1433 |
|---|---|---|---|
| 11,132,367 B1 * | 9/2021 | Chud | G06F 16/24554 |
| 2012/0143867 A1 * | 6/2012 | Roy | G06F 16/90 707/E17.089 |
| 2012/0259793 A1 * | 10/2012 | Umansky | G06Q 10/06 705/348 |

(Continued)

OTHER PUBLICATIONS

Andrew, Myers, "CS 2112 Spring 2012 Lecture 24: Graph traversals", posted Apr. 2012, https://www.cs.cornell.edu/courses/cs2112/2012sp/lectures/lec24/lec24-12sp.html (Year: 2012).*

(Continued)

*Primary Examiner* — Sarah Le
(74) *Attorney, Agent, or Firm* — Buckley, Maschoff & Talwalkar LLC

(57) ABSTRACT

Provided are systems and methods which generate and display a relationship diagram that visually depicts relationships between items in an order including both non-service components (e.g., products, materials, software applications, drivers, etc.) and service components for servicing one or more of the non-service components. In one example, the method may include receiving a request from a user interface, querying a data store for dependency data of a plurality of components included an order based on an order identifier included in the received request, generating a visualization based on the dependency data of the plurality of components, wherein the visualization comprises a plurality of graphical elements representing the plurality of components, (Continued)

and directional edges between the plurality of graphical elements representing dependencies among the plurality of components, and rendering the diagram via the user interface.

19 Claims, 9 Drawing Sheets

(56) References Cited

U.S. PATENT DOCUMENTS

| | | | |
|---|---|---|---|
| 2016/0378615 A1* | 12/2016 | Cohen | G06F 11/00 714/19 |
| 2020/0043107 A1* | 2/2020 | Bertness | G06Q 20/18 |
| 2020/0226512 A1* | 7/2020 | Epstein | G06Q 10/0635 |
| 2021/0090694 A1* | 3/2021 | Colley | G16H 15/00 |
| 2021/0158281 A1* | 5/2021 | Mimassi | G06K 19/06037 |
| 2023/0081051 A1* | 3/2023 | Brooks | G06Q 10/08 |

OTHER PUBLICATIONS

Erin Decaprio, "Dependency Analysis", posted Oct. 6, 2006, https://www.projectmanagement.com/wikis/233046/dependency-analysis-#_=_ (Year: 2006).*

* cited by examiner

FIG. 3

Order ID: 100
Total Cost: $7,999.00

| Item No. | Description | Category | Dependency | Status |
|---|---|---|---|---|
| 301 | Printer | Part | (3) | |
| 302 | Cable | Part | (2) | |
| 303 | Installation | Service | (2) | |
| 304 | Paper | Part | (1) | |
| 305 | RFID | Part | (1) | (In Transit) |
| 306 | Service Plan | Service | (1) | (Waiting) |
| ... | ... | | | |

Dependency UI 320
- Depends from Item 301 — 322
- Dependency for Item 303 — 324

VISUALIZATION OF RELATIONSHIPS AMONG ORDER COMPONENTS

BACKGROUND

An entity such as a manufacturer, supplier, etc., may offer both products (e.g., physical goods, parts, software applications, etc.) as well as services (e.g., installation, repair, warranty, subscriptions, projects, etc.) for such products. As an example, a manufacturer may sell an elevator to a consumer while also providing an installation service for installing the elevator. Furthermore, the manufacturer may also provide a one-year service warranty for the elevator that begins once the elevator is installed. In this case, the service components of the order have dependencies on the non-service components of the order (i.e., the products being sold such as physical goods and software). Specifically, the installation cannot be performed until the elevator and its accessories (cables, hydraulics, etc.) are delivered.

To ensure that the elevator installation occurs at the correct time (i.e., the installer is not sent to the site before the elevator and all the accessories arrive), the manufacturer must manually keep track of the status of the products to ensure that the service components are not missed or performed out of order. For example, if a service technician arrives to install the elevator but the hydraulics parts have not been delivered or installed, the service technician will be unable to perform the installation of the elevator. Also, the warranty should not start until the elevator is fully installed. Therefore, the manufacturer must keep track of when the elevator is installed before starting the service contract.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 3 is a diagram illustrating dependency information integrated within a view of an order in accordance with an example embodiment.

Figure 1A:
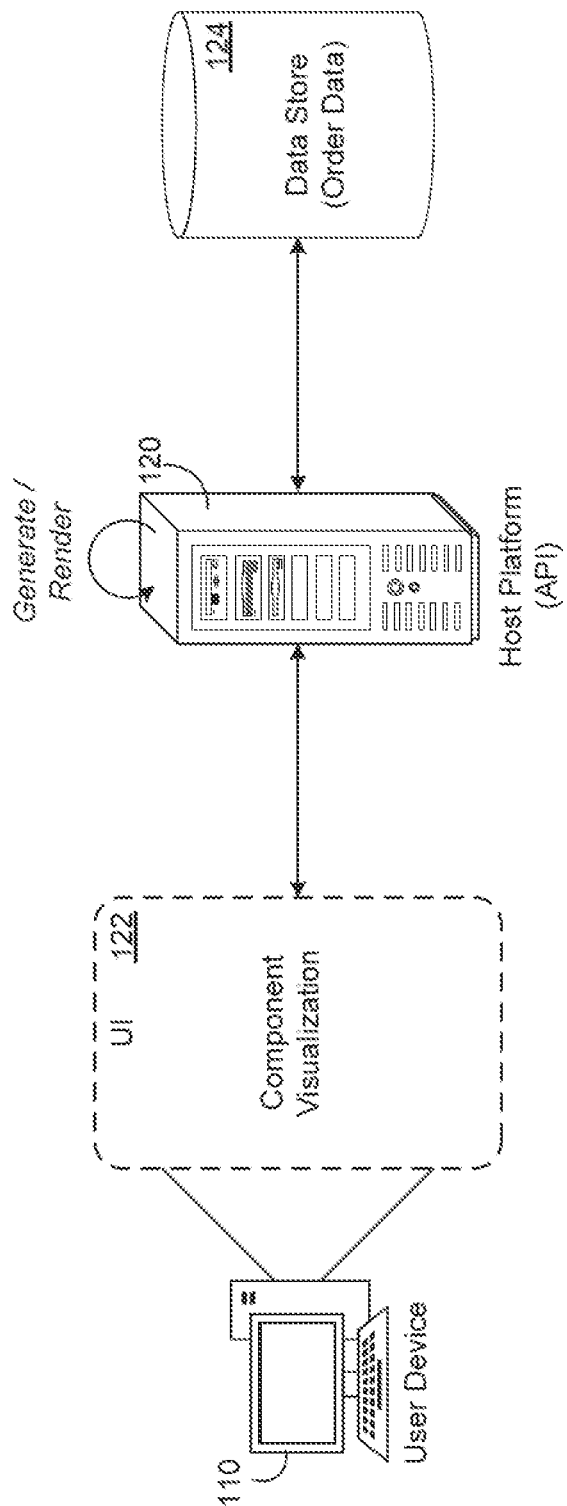
FIG. 1A is a diagram illustrating a computing environment for visualization of dependencies among components in an order in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a new type of visualization that provides a compact and easy understanding of the dependencies among items (also referred to herein as components, objects, parts, etc.) of an order such as a sales order. For example, an order may include product components (e.g., products such as physical goods, software products, etc.) and service components (i.e., for servicing the product components in some way). Here, the service components may be "depend" from the product components. As an example, a service component for a printer may only be performed when the printer, the cables, the paper, the software drivers, and the necessary sensors have been properly installed. This also requires the ancillary physical parts (cables, sensors, paper, etc.) to be installed, the software drivers to be installed, and the printer to be delivered and ready for installation.

According to various embodiments, components within an order may be analyzed to identify dependencies among them. For example, machine learning, predefined rules, user input, and the like, may be used to establish dependencies among components in an order. The product components may include physical products and materials as well as software-based products such as applications, etc. Other types of components include service components. The dependencies may be identified when the order is submitted and stored within a database that also includes the order data. When the order data is subsequently queried from the database, the system may also receive the dependency data identified between the components of the order and use the dependency information when creating the visualization. The visualization may provide a viewer with a visual understanding of the dependencies between the components of the order with simple graphics and directional arrows between the graphics. The visualization may be generated on the same screen as an order (i.e., and output simultaneously on a display screen with the order).

For example, each of the components in the order (including both product and service components) may be represented by a uniformly shaped and sized graphical element. For example, the graphical element may be an icon, a shape (e.g., circle, square, rectangle, triangle, dot, etc.), multiple shapes, an image, or the like. As a non-limiting example, a plurality of components from an order may be represented by a plurality of commonly-shaped graphically elements regardless of whether the components are service components or non-service components such as items including physical goods, software, etc.

Furthermore, edges may be disposed in between the graphical elements to provide dependency information. For example, an edge may include an arrow disposed somewhere along the edge between a first graphical element and a second graphical element corresponding to a first component and a second component from an order. The arrow may point in a direction away from the second graphical element and towards the first graphical element to indicate that the second component is dependent from the first component. As an example, a directional arrow may be used to represent that a service component depends on a non-service component being delivered and installed before the service component can be performed and/or started. As another example, a directional arrow may be used to represent that the service component must be performed before the non-service component (e.g., the product) can be delivered and installed. For example, a plant floor may need to be cleared before a new piece of machinery can be installed. In this case, the service (e.g., cleaning the plant floor, etc.) would need to be performed before the delivery and installation of the product.

The visualization may be rendered via a user interface such as a user interface provided to a seller of the components in the order. The user interface may display the order itself in a first module and display the dependency visualization in a second module in parallel with and at the same time (simultaneously with) the order itself. In addition to the dependencies within the order, the visualization may also be used to identify a status of each component. For example, colors, shading, highlighting, markings, tags, etc., may be added to the graphical elements to distinguish components that have been completed from components that are not yet completed. Also, distinguishing marks may be used to differentiate between components that are waiting and can be completed, from components that are waiting and that cannot be completed due to errors such as another component has not been delivered or installed. By combining both the dependency information and the status information within the visualization, a user can quickly and easily understand what needs to be performed next to complete the order.

Sequences of graphical elements within the visualization may be used to represent a set of components in the order that sequentially depend from each other (e.g., a first component must be delivered and/or installed before a second component can be installed/performed, etc.) Also, two or more graphical elements may depend from the same graphical element. For example, a printer may need both cables and an RFID sensor installed. In this case, the two graphical elements may be displayed in parallel to one another to indicate that they can be performed at the same time (i.e., they are not dependent on one another). For example, a root graphical element may represent a part (e.g., the printer), and multiple paths of sequences of graphical elements may branch off of the root graphical element indicating multiple groups of components that are to be delivered/installed/ performed for the part (e.g., separate paths for the cables and the RFID). Furthermore, individual status of each component may be provided within the visualization. By viewing the visualization, a user can quickly identify/understand which component/path is delayed and why.

FIG. 1A illustrates a computing environment 100 for visualization of dependencies among components in an order in accordance with an example embodiment. Referring to FIG. 1A, a user is interacting with order data via a user device 110. Here, the user device 110 is connected to a host platform 120 (e.g., a cloud platform, a web server, a database, an on-premises server, etc.) via a network such as the Internet. The host platform 120 outputs/provides a user interface 122 as part of a software application, program, service, process, etc., that is hosted by the host platform 120. The user may input commands into the user interface 122, for example, using a mouse, pointer, keyboard, finger, etc.

The input commands may trigger the host platform 120 to generate a visualization for an order. Here, the host platform 120 may query a data store 124 that stores order data, including dependency data identifying dependencies, interdependencies, etc. among components within the order. The host platform 120 may query the data store 124 via an application programming interface (API) of the host platform 120, the data store 124, a combination thereof, and the like. In response, the host platform 120 may receive order data including a list of components in the order, dependency information, and status information. The host platform 120 may generate a visualization of the status of the components in the order based on the dependency information and the status information, and render the visualization within a module, window, box, etc. of the user interface 122. A non-limiting example of a visualization 230 is shown in FIG. 2B, and is further described below with respect to FIG. 2B.

The user interface 122 may also include additional dependency information. For example, an order or a list of components within the order may be displayed within dependency icons/data. When a user interacts with a dependency icon for a component in the order, the user interface 122 may display additional dependency information for the component including identifiers of all other components that depend from the component and all other components from which the component depends. A non-limiting example of such dependency information is shown in FIG. 3, and is further described below with respect to FIG. 3.

Figure 1B:
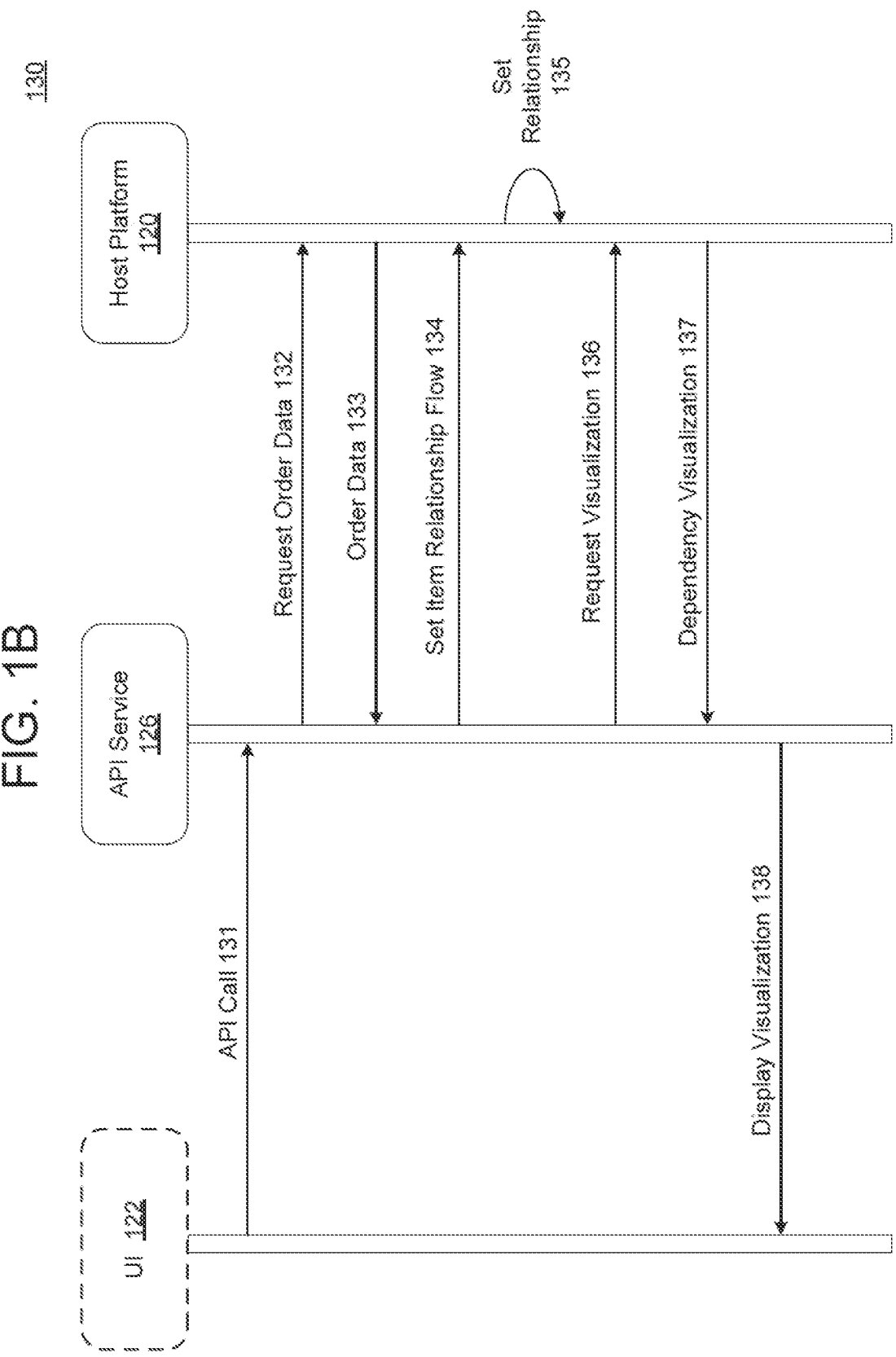
FIG. 1B is a diagram illustrating a process of querying order data and visualizing dependencies among the order data in accordance with an example embodiment.

FIG. 1B illustrates a process 130 of querying order data and visualizing dependencies among the order data in accordance with an example embodiment. Referring to FIG. 1B, the user interface 122 communicates with an application programming interface (API) service 126 that is hosted by the host platform 120. In this example, it is assumed that the host platform 120 also has access to the order data shown in the data store 124 of FIG. 1A. Here, the user interface 122 generates and sends an API call 131 to the API service 126 in response to a user press of a button within the user interface 122 or some other command/input. For example, a button inside the user interface with the label "Relationships" may be pressed by the user using an input device such as a keyboard, a mouse, a finger (touch), etc. In response, an event handler in ObjectPageExtController.js may be called and a request sent to the API call 131 as a result. Here, the user interface 122 may identify an order that is currently displayed on the screen and also an identifier of such an order (e.g., an order number, etc.) This information may be retrieved from a data object of the order, etc.

The API call 131 may include the identifier of the order that the user is viewing within the user interface 122. In response to the API call, the API service 126 may query the host platform 120 (e.g., the data store 124 storing order data, etc.) for additional data for the order, in 132. Here, the querying may be performed based on the order identifier included in the API call 131. The querying may include a structured query language (SQL) query, a NoSQL query, or the like.

In 133, the host platform 120 may return the items (components) that are included in the order along with dependency data between the components in the order. In some embodiments, the dependency data may be previously generated and stored. As another example, the host platform 120 may determine the dependency data on the fly (i.e., in response to the request in 132). In 134, the API service 126 identifies a flow (i.e., dependencies) between the components in the order and provides the flow to the host platform 120. In 135, the host platform 120 sets the flow between the components in the order. In 136, the API service 126 requests a visualization to be generated/built based on the identified flow. In 137, the host platform 120 generates the visualization and provides the visualization to the API service 126. In 138, the API service 126 renders the visualization within the user interface 122.

Figure 2A:
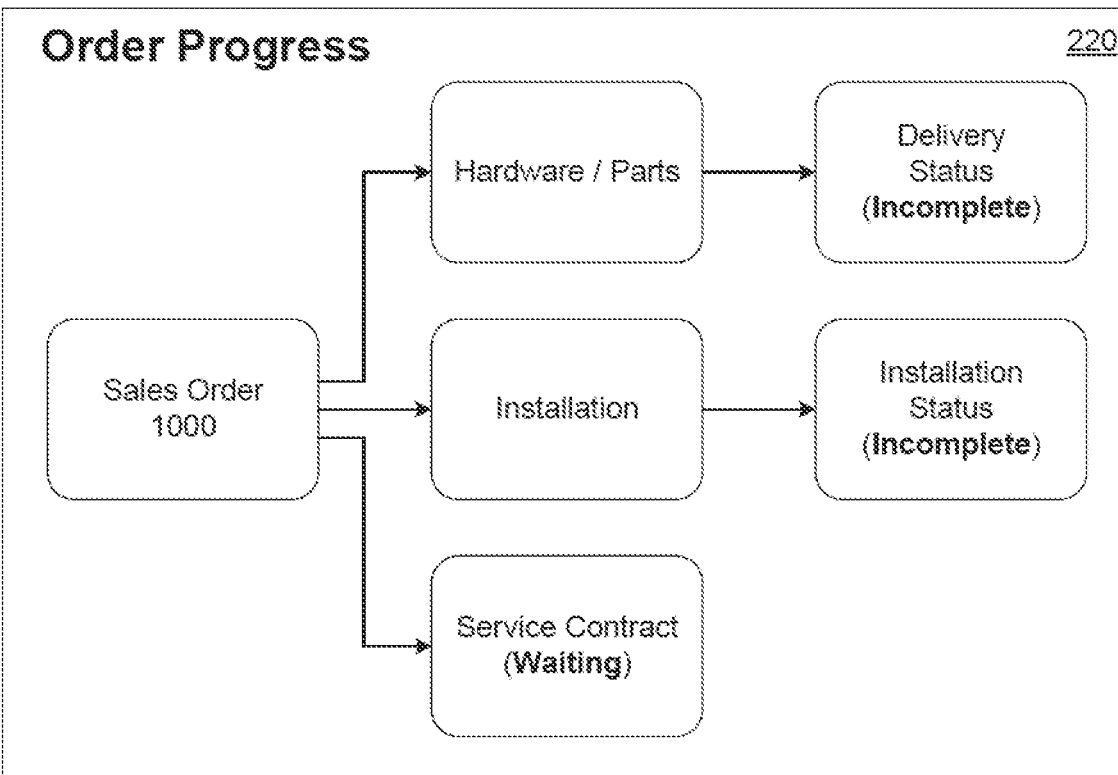
FIG. 2A is a diagram illustrating a view of an order including a list of components and an order progress window in accordance with an example embodiment.
Figure 2B:
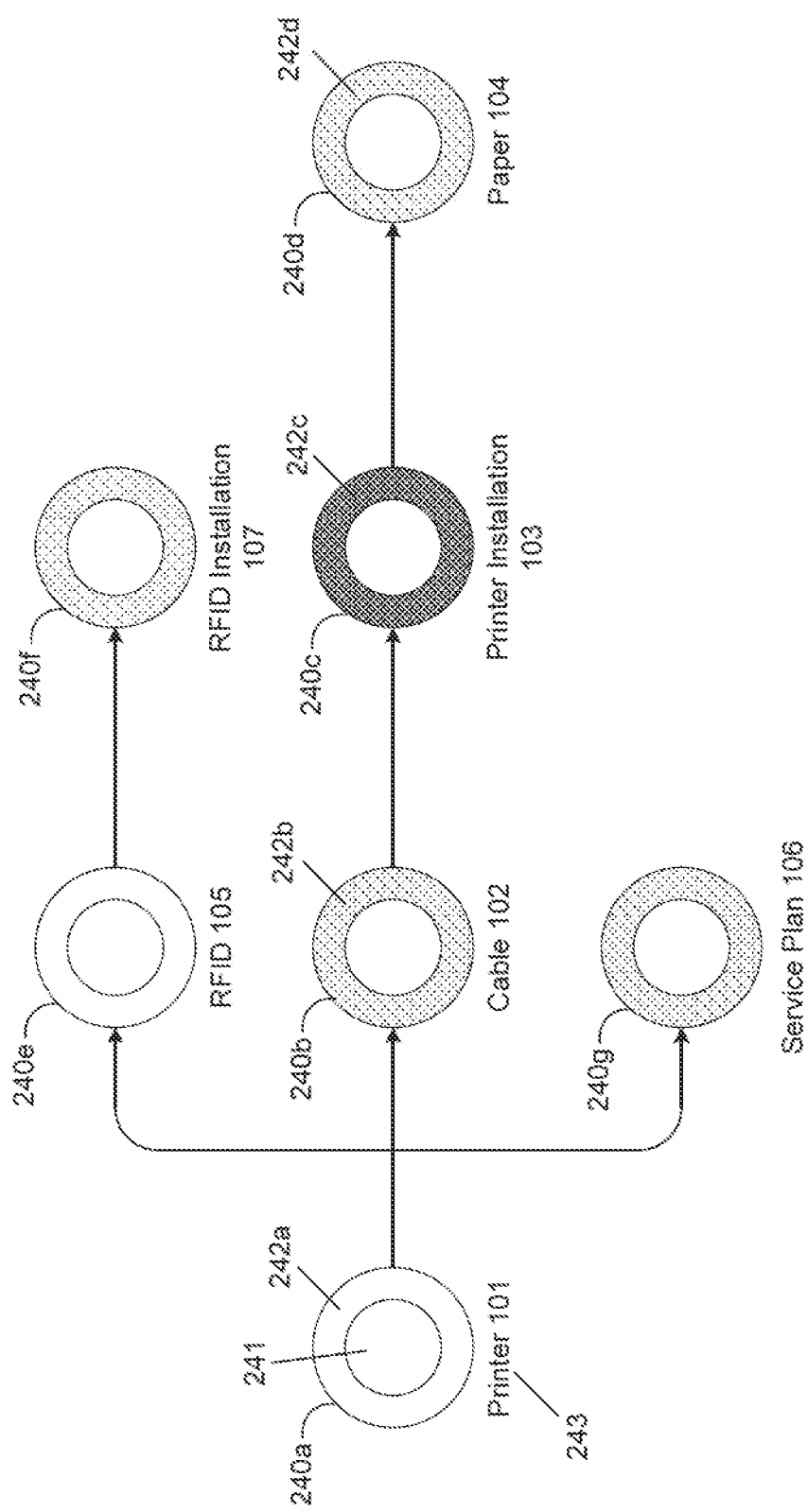
FIG. 2B is a diagram illustrating a dependency visualization of the components in the order of FIG. 2A, in accordance with an example embodiment.

FIG. 2A illustrates a view 200 of an order 210 including a list of components and a progress window 220 in accordance with an example embodiment. Referring to FIG. 2A, the order 210 includes a plurality of components which have each been retrieved by the querying described in FIG. 1B, and visualized as shown in FIG. 2A. In particular, each component within the order is displayed via an entry 212. Each entry 212 includes an item number value 214, a description value 216, and a status value 218. For example, the printer component 101 is assigned item number "101". Other components such as cable component 102, paper component 104, and an RFID sensor component 105 are assigned item numbers "102", "104", and "105", respectively. The item number values 214, the description values 216, and the status values 218 may be obtained from the data store 124 shown in FIG. 1A and/or the host platform 120 shown in FIG. 1B.

The progress window 220 shows the overall progress of the components in the order. In this example, the overall progress indicates that there is a problem with the delivery of the hardware for the order 210, a problem with the installation of the printer, and a delay for starting the service contract. However, the causes of these issues are not visible. In other words, a user may be frustrated with the incomplete status of the order shown in the progress window 220, but it is not readily ascertainable why the status is incomplete.

According to various embodiments, the system described herein may create a visualization that allows a user to easily understand why an order (or parts of an order) are delayed based on a combination of dependency information of the components in the order and status information of the components in the order. Furthermore, the visualization can also identify aspects of the order that have been and/or that can be completed without delay.

FIG. 2B illustrates a visualization 230 of the components in the order of FIG. 2A, in accordance with an example embodiment. In this example, the visualization 230 represents dependencies and statuses of the components of the order 210 for the printer. Referring to FIG. 2B, the visualization includes a plurality of graphical elements 240a-240g that each have a uniform size (e.g., a same width, height, boundary, etc.), and a uniform shape (e.g., a circle). Thus, each graphical element 240a-240g is the same size, the same shape, and is identical to the other graphical elements. Each graphical element 240a-240g in this example includes an inner circle 241 that is the same color/shading across all graphical elements 240a-240g, and an outer ring (e.g., outer ring 242a) that has a dynamic color/shading that may differ among the graphical elements 240a-240g. In particular, the outer ring can be colored, shaded, highlighted, etc., differently to distinguish components that have been successfully delivered and/or installed from components that are not delivered and/or installed.

To better assist the viewer with the understanding of the components, a descriptive label 243 may be added to each graphical element that describes the component (e.g., that identifies the component). The descriptive label 243 may be provided underneath the graphical element, above the graphical element, to the side of the graphical element, inside of the graphical element, and the like.

In this example, the graphical element 240a represents the printer component 101 and includes an outer ring 242a that is translucent or without color indicating that the components has been successfully completed. Meanwhile, the cables component 102, which must be attached to the printer component 101 for proper installation, has not been completed because it has not yet been delivered. Accordingly, an outer ring 242b around a graphical element 240b representing the cables component 102 can be colored or shaded differently to indicate that the cables component 102 has not been completed. Furthermore, the printer installation component 103 cannot be completed because the printer installation component 103 is dependent on both the printer component 101 being completed and the cables component 102 being completed. In this case, only the printer component 101 has been completed since it has been delivered while the cables component 102 has not been completed because it still has not been delivered. Therefore, the printer installation component 103 cannot be performed because the cables component 102 is not completed.

In this example, a potential error is detected because a service (e.g., printer installation component 103) cannot be completed as a result of a physical component (e.g., cables component 102) not being completed. The error can be visualized via an outer ring 242c of a graphical element 240c representing the printer installation component 103. For example, the outer ring 242c may be colored or shaded differently than the outer ring 242a of the printer component 101 to indicate that the printer installation has not yet been completed. In addition, the outer ring 242c may be colored or shaded differently than the outer ring 242b of the cables 102 to indicate that the printer installation component 103 is a service that requires a hardware component (i.e., cables 102) to be completed. Meanwhile, a paper component 104 is represented by graphical element 240d. Here, the paper component 104 cannot be completed until the printer installation component 103 is completed. Accordingly, the host system may display an outer ring 242d that is colored the same as the outer ring 242b of the graphical element 240b to indicate that the paper component 104 has not been completed.

In the example of FIG. 2B, three parallel paths of graphical elements are shown. In one instance, a sequence of graphical elements 240a, 240b, 240c, and 240d, corresponds to the printer component 101, the cables component 102, the printer installation component 103, and the paper component 104, in an order 210 that must be completed in sequence. Other components may also be present and may be part of different sequences or not part of any sequences. In this example, an RFID component 105 and an RFID installation component 107 may be part of a parallel sequence of components that can be completed in parallel with the printer install sequence. Because the RFID component 105 delivery is complete, a graphical element 240e that represents the RFID component 105 may include an outer ring that is translucent indicating completion. However, an RFID installation component 107 has not been completed (e.g., the technician may be waiting to install the RFID component 105 at the same time as the printer installation component 103). Here, a graphical element 240f corresponding to the RFID installation component 107 may be shaded or otherwise colored by the host system to indicate that the RFID installation component 107 is not completed.

By using the parallel paths, a user can quickly ascertain how the status of certain components in an order affects the other components. In some cases, the status of a component may have a direct effect on another component (i.e., the printer installation component 103 cannot be installed because the cables component 102 has not been completed). As another example, the status of a component may not affect another component. For example, cables component 102 does not affect the RFID installation component 107. Therefore, if the technician wanted to, the technician could install the RFID component 105 and complete the RFID installation component 107.

It should be appreciated though that the example embodiments are not limited to the visualization content that is shown in FIG. 2B. For example, the graphical elements in FIG. 2B are circles with outer rings around the circles. However, the visualization is not limited to circular-shaped graphical elements and may include other shapes (e.g., squares, rectangles, triangles, ovals, a combination of shapes, etc.), icons, images, etc.

FIG. 3 illustrates a user interface 300 that includes a view of order data integrated with dependency information in accordance with an example embodiment. Referring to FIG. 3, an order 310 includes a list of components with item numbers 301, 302, 303, 304, 305, and 306. Here, each of the components in the order includes dependency data that is stored within a dependency column 312. For example, item number 302 has a dependency value 314 which is being selected by a user with a cursor. The dependency data values (e.g., such as dependency value 314) may be interactive such as hyperlinks. In particular, the hyperlink associated with a dependency value 314 includes a numerical value "2" representing a number of dependencies, and parenthesis around the numerical value indicating that the dependency value is interactive.

When a user selects the dependency value 314, the system displays a user interface 320 with dependency information described therein. Here, the dependency information identifies other components in the sales order 310 that have a dependency associated with the component (item number 302). In this example, the item number 302 has a dependency on item number 301 being delivered. Furthermore, another item (i.e., item number 303) is dependent on the item number 302 being delivered. Therefore, two different pieces of dependency information may be stored in the user interface 320 including a first dependency description 322 specifying what the component depends on, and a second dependency description 324 specifying what components depend on the component. If the component does not have one or more of these dependencies, the dependency information can be omitted.

In addition to the dependency column 312, the order 310 may also include a description of the item, a category that defines the type of the item (e.g., service component or parts component, etc.), and a current status of the item (e.g., delivered, waiting, in transit, delayed, etc.). For example, the categories may include software products, physical products or parts, services for the products, and the like. The order data within the user interface 300 shown in FIG. 3 may be included in a window that can accessed from the visualization 230 shown in FIG. 2B. As another example, the user interface 300 shown in FIG. 3, may be displayed simultaneously with the visualization 230 shown in FIG. 2B. For example, the user interface 300 may be included in a first display module that is positioned adjacent to, above, below, etc., the visualization 230 shown in FIG. 2B thereby allowing a user to simultaneously view the sales order and visualize the dependencies among the components of the sales order.

Figure 4:
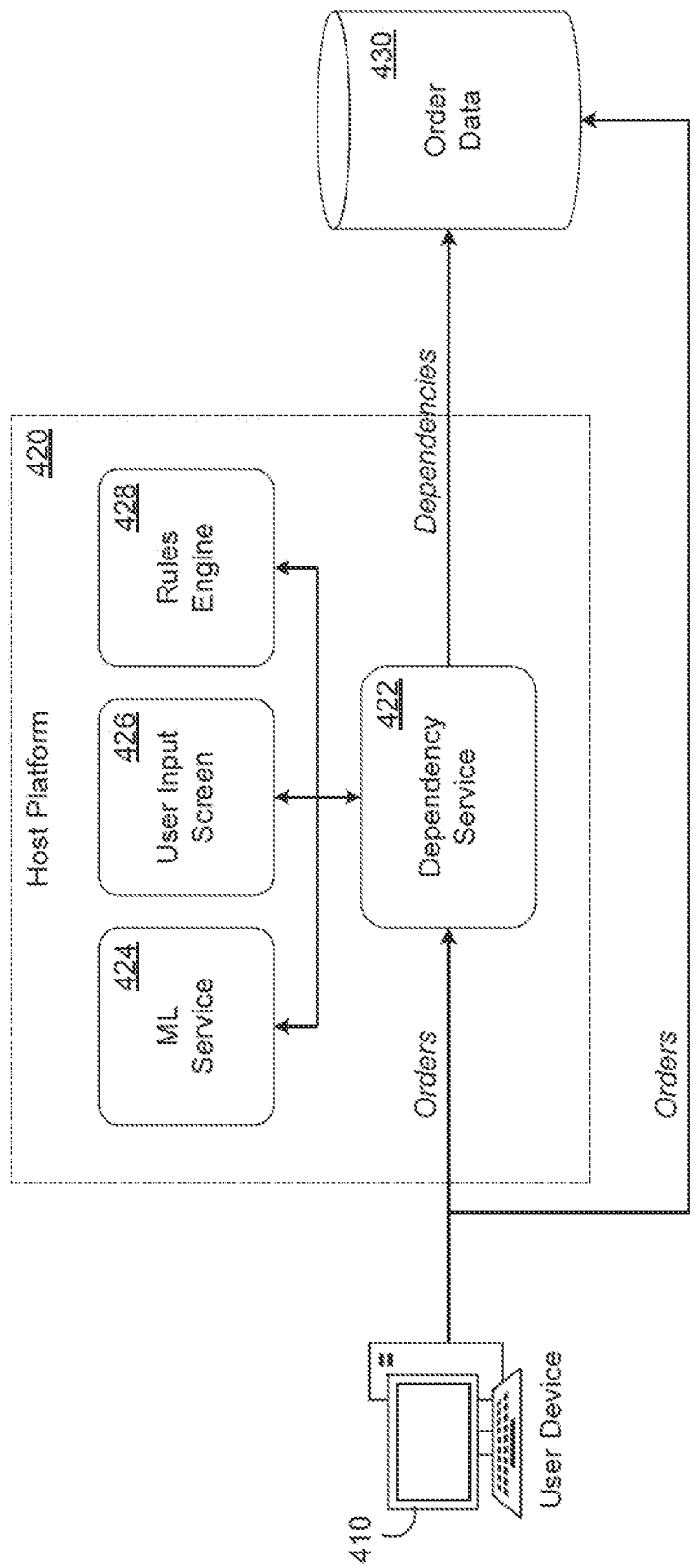
FIG. 4 is a diagram illustrating a process of identifying dependency data for components in an order in accordance with an example embodiment.

FIG. 4 illustrates a process 400 of a host platform 420 identifying dependency data for components in an order in accordance with an example embodiment. For example, the process 400 may be performed by the host platform 420 as new orders are submitted to the host platform 420 by a user device 410. In other words, the sales order data may be received and dependency information extracted prior to the user requesting to view the visualization of the dependencies among the items in an order. This information may be stored ahead of time in a data store 430. Here, the data store 430 may correspond to the data store 124 described with respect to FIG. 1B.

In this example, the host platform 420 may use any of multiple options for extracting dependency data from an order. For example, a dependency service 422 may be hosted by the host platform 420 and may communicate with one or more other services such as a machine learning service 424, a user input screen 426, a rules engine 428, and the like. For example, machine learning models executed by the machine learning service 424 may predict component dependencies among components in an order. The machine learning models may be trained from historical sales orders where dependency mappings have already been identified. As another example, a user may specify dependencies among items based on user input via a user input screen 426. Here, the user input screen 426 may provide the user with menus, buttons, selectable options, drop-downs, etc. which allow the user to specify which components are dependent on other components. As another example, the rules engine 428 may be pre-coded rules that specify which components depend from other components in an order. The dependency service 422 may use any of these other services to identify dependency data in an order, and store the data in the data store 430 with the order data. For example, both the order data and the dependency data may be assigned the same order identifier to ensure that the two pieces of data are mapped.

Figure 5:
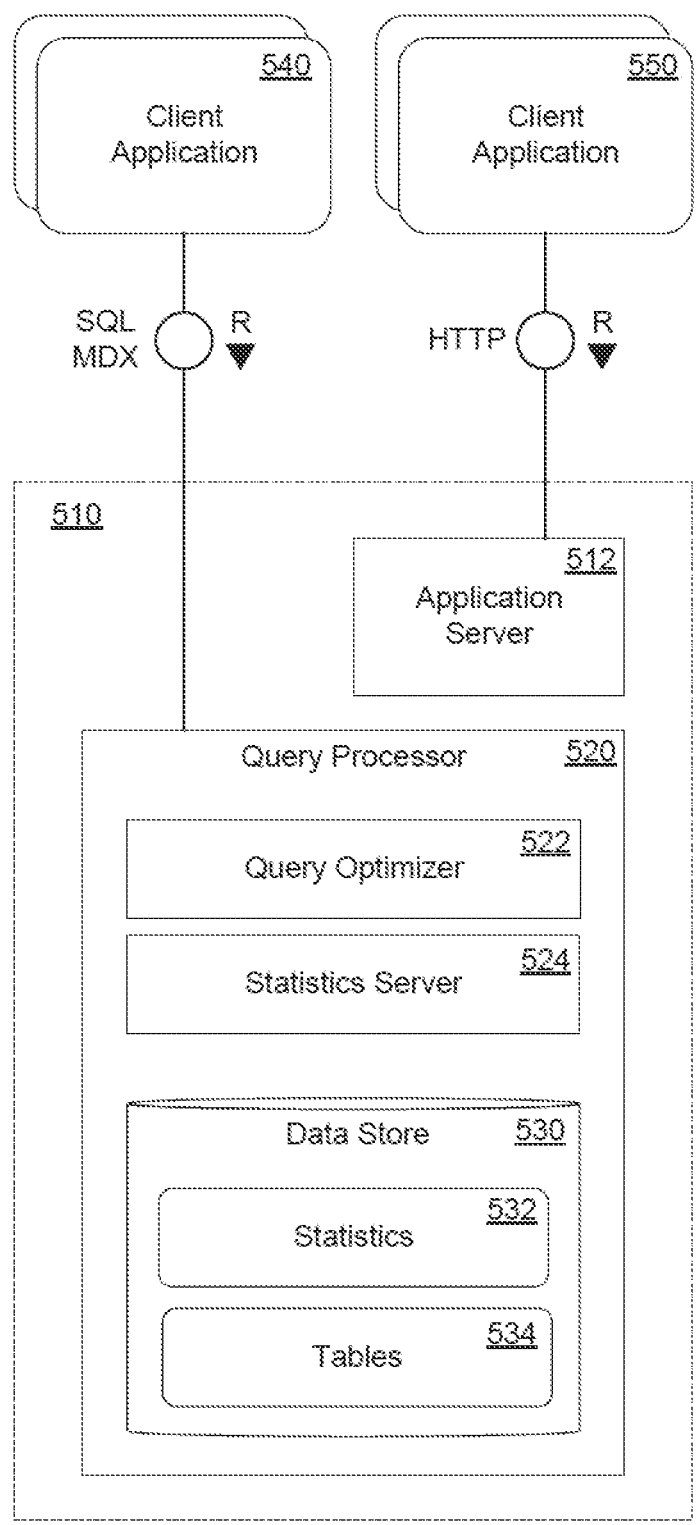
FIG. 5 is a diagram illustrating an example of a database system in accordance with an example embodiment.

FIG. 5 illustrates an example of a database system 500 according to some embodiments. For example, the database system 500 may be used to store order data and may be queried via the API service 126 shown in FIG. 1B. It should also be appreciated that the present application is not limited to the architecture shown in FIG. 5, or a database at all. Referring to FIG. 5, the database system 500 may include a node 510 (e.g., a database node, a server node, a virtual machine, etc.) which may be part of a larger group of nodes. Generally, the node 510 may receive a query (e.g., SQL query, OQL query, XQuery, etc.) from any of client applications 540 and 550 and return results thereto based on data stored within a data store 530 of the node 510. In this example, the node 510 may execute program code to provide an application server 512 and query processor 520. The application server 512 provides services for executing server applications. For example, Web applications executing on an application server may receive Hypertext Transfer Protocol (HTTP) requests from client applications 550 as shown in FIG. 5.

Query processor 520 may include the stored data and engines for processing the data. In this example, query processor 520 is responsible for processing Structured Query Language (SQL) and Multi-Dimensional eXpression (MDX) statements and may receive such statements directly from client applications 540.

Query processor 520 includes a query optimizer 522 for use in determining query execution plans and a statistics server 524 for determining statistics used to estimate query execution plan costs. The statistics server 524 may generate such statistics based on other stored statistics as described herein including histograms with distinct value sketches integrated therein. For example, in response to reception of a query consisting of a conjunct of several predicates on a stored table (or view) of the node 510, the statistics server 524 may estimate selectivity of the query based on known selectivities of various conjuncts of the query predicates.

In some embodiments, underlying database data capable of being queried may be stored in a data store 530 that includes tables 534 such as row-based data, column-based data, and object-based data. Here, the tables 534 may store order content and dependency data that is accessible to the client applications 540 and 550 Furthermore, the data within the tables 534 may be indexed and/or selectively replicated in an index (not shown) to allow fast searching and retrieval thereof. The node 510 may support multi-tenancy to separately support multiple unrelated clients by providing multiple logical database systems which are programmatically isolated from one another.

In some embodiments, the node 510 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

According to various embodiments, when the query processor 520 receives a database query from one of the client applications 540 and 550, the query processor 520 may trigger the query optimizer 522 to generate a query execution plan for the database query. The query optimizer 522 may use the statistics 532 to calculate costs of each query. The generated query execution plan can then be executed to carry out the database query on the tables 534 and return the results to the client applications 540 and 550.

The client applications 540 and 550 may include user interfaces that may display the dependency visualization that is described herein. For example, order data that is queried from the tables 534 may be viewed in tabular format, a digital sales order, a spreadsheet format, or the like, via a user interface of any of the client applications 540 and 550. The dependency visualization may be used to improve the understanding of the dependencies of items in an order of the client applications 540 and 550. In some embodiments, the software code for generating the dependency visualization may be implemented within a library, code module, etc., that is made available to developers of the client applications 540 and 550.

Figure 6:
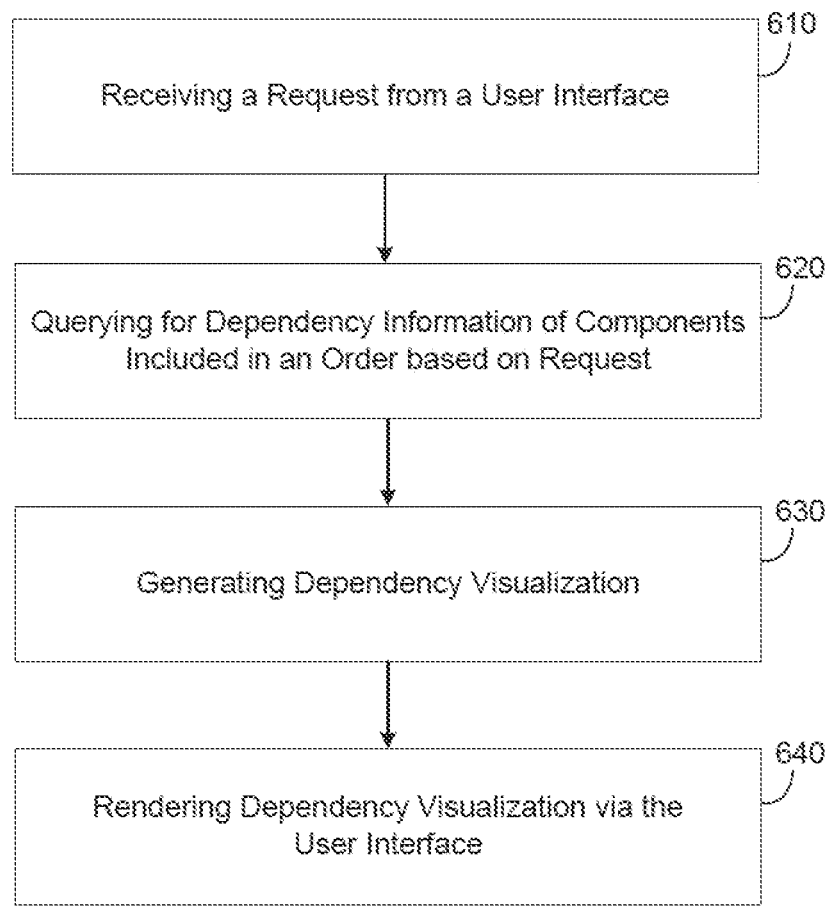
FIG. 6 is a diagram illustrating a method of visualizing dependencies among components in an order in accordance with an example embodiment.

FIG. 6 illustrates a method 600 of visualizing dependencies among components in an order in accordance with an example embodiment. As an example, the method 600 may be performed by a web server, a cloud platform, an on-premises server, a database node included within a distributed database system, a user device, and the like. Referring to FIG. 6, in 610, the method may include receiving a request from a user interface. For example, the request may include a press of a GUI element such as a button, a link, or the like, which triggers the system to retrieve order data associated with an order being displayed on the screen.

In 620, the method may include querying a data store for dependency data of a plurality of components included in an order based on an order identifier included in the received request. As an example, the querying may be performed via an application programming interface (API) of a data store, and may be used to retrieve dependencies between a plurality of components included in an order. In 630, the method may include generating a dependency visualization based on the dependency data of the plurality of components, wherein the dependency visualization comprises a plurality of graphical elements representing the plurality of components, and directional edges between the plurality of graphical elements representing dependencies among the plurality of components. In 640, the method may include rendering the dependency visualization via the user interface.

In some embodiments, the generating may include generating each graphical element, from among the plurality of graphical elements, with a same shape and a same size. In some embodiments, the generating may include displaying a first graphical element representing a physical component and a second graphical element representing a service component to be performed for the physical component, and a directional edge between the first and second graphical elements indicating the service component depends on the physical component being installed.

In some embodiments, the generating the dependency visualization may include visually differentiating a first set of graphical elements that correspond to components in the order that have been completed from a second set of graphical elements that correspond to components in the order that have not yet been completed. In some embodiments, the visually differentiating may include displaying a first color around the first set of graphical elements and a different color around the second set of graphical elements.

In some embodiments, the generating the dependency visualization may include arranging a first row of graphical elements corresponding to a first group of components in the order that are dependent on each other and arranging a second row of graphical elements corresponding to a second group of components in the order that are dependent on each other. In some embodiments, the method may further include arranging the first row of graphical elements in parallel with and above the second row of graphical elements when the first group of components are independent from the second group of components, and both depend from a same component in the order. In some embodiments, the generating the relationship diagram may include generating identical graphical elements for a physical component in the order and a service component in the order for servicing the physical component.

Figure 7:
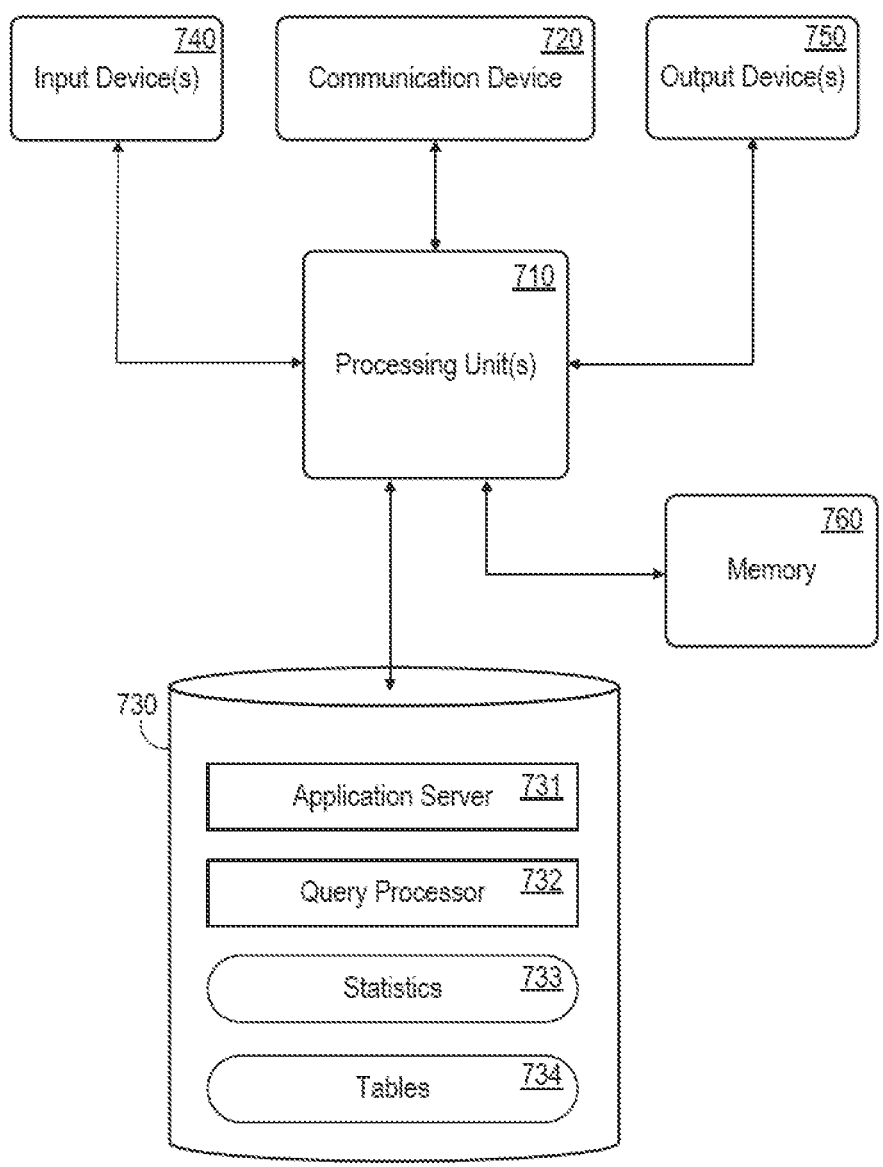
FIG. 7 is a diagram illustrating a computing system for use in the embodiments that are described herein.

FIG. 7 is a diagram of a server node 700 according to some embodiments. The server node 700 may include a general-purpose computing apparatus and may execute program code to perform any of the functions described herein. For example, the server node 700 may generate and display the dependency visualization described according to various embodiments. Furthermore, the server node 700 may implement an API and query order data and dependency data for items in the order, as described herein. The server node 700 may comprise an implementation of the node 510 shown in FIG. 5, in some embodiments. It should also be appreciated that the server node 700 may include other unshown elements according to some embodiments and may not include all of the elements shown in FIG. 7.

Server node 700 includes processing unit(s) 710 (i.e., processors) operatively coupled to communication device 720, data storage device 730, input device(s) 740, output device(s) 750, and memory 760. Communication device 720 may facilitate communication with external devices, such as an external network or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into the server node 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM). In some embodiments, the data storage device 730 may store user interface elements in tabular form. For example, one or more columns and one or more rows of user interface elements may be displayed in a two-dimensional spreadsheet, table, document, digital structure, or the like.

Application server 731 and query processor 732 may each comprise program code executed by processing unit(s) 710 to cause server node 700 to perform any one or more of the processes described herein. Such processes may include estimating selectivities of queries on tables 734 based on statistics 733. Embodiments are not limited to execution of these processes by a single computing device. Data storage device 730 may also store data and other program code for providing additional functionality and/or which are necessary for operation of server node 700, such as device drivers, operating system files, etc As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a processor configured to:
      receive a request from a user interface;
      query a data store for dependency data of a plurality of components included in an order based on an order identifier included in the received request, the dependency data identifying a dependency between the plurality of components and identifying a completion status for each of the plurality of components;
      receive, in response to the query, the dependency data of the plurality of components;
      generate a dependency visualization based on the dependency data of the plurality of components included in the order, wherein the dependency visualization comprises a root graphical element that represents the order, a plurality of graphical elements that represent the plurality of components of the order including a first set of graphical elements representing one or more of a physical component and a software component and a second set of graphical elements each representing a service component to be performed for the one or more of the physical component and the software component, respectively, and directional edges between the first set of graphical elements and the second set of graphical elements that represent dependencies among the plurality of components of the order, respectively;
      identify, based on the dependency data of the plurality of components, a first part of the order that has not been completed and a second part of the order that is dependent on completion of the first part of the order; and
      render the dependency visualization via the user interface, wherein the processor is configured to distinguish an appearance of a graphical element that corresponds to the second part of the order from the plurality of graphical elements within the dependency visualization based on the identified first part of the order not being completed and being dependent on the identified first part of the order, each rendered graphical element including an inner graphical component and a dynamically configurable outer graphical component surrounding the inner graphical component to indicate the completion status thereof.

2. The computing system of claim 1, wherein the processor is configured generate each graphical element, from among the plurality of graphical elements, with a same shape and a same size.

3. The computing system of claim 1, wherein a directional edge between the first and second graphical elements indicates the service component depends on the one or more of the physical component and the software component being installed or that the one or more of the physical component and the software component depend on the service component being performed first.

4. The computing system of claim 1, wherein the processor is configured to visually differentiate an appearance of a third set of graphical elements that correspond to a part of the order that has been completed from the appearance of the graphical element that corresponds to the first part of the order that has not yet been completed by varying at least one of a shading and a coloring of the outer component of the third set of graphical elements.

5. The computing system of claim 4, wherein the processor is configured to render the outer graphical component as a first color for the first set of graphical elements and a different color for the third set of graphical elements.

6. The computing system of claim 1, wherein the processor is configured to arrange a first row of graphical elements corresponding to a first group of components in the order that are dependent on each other and arrange a second row of graphical elements corresponding to a second group of components in the order that are dependent on each other.

7. The computing system of claim 6, wherein the processor is further configured to arrange the first row of graphical elements in parallel with and above the second row of graphical elements when the first group of components are independent from the second group of components, and both groups depend from a same component in the order.

8. The computing system of claim 1, wherein the processor is configured to generate identical graphical elements for a non-service component in the order and a service component in the order for servicing the non-service component.

9. A method comprising:
receiving a request from a user interface;
querying a data store for dependency data of a plurality of components included in an order based on an order identifier included in the received request, the dependency data identifying a dependency between the plurality of components and identifying a completion status for each of the plurality of components;
receive, in response to the query, the dependency data of the plurality of components;
generating a dependency visualization based on the dependency data of the plurality of components included in the order, wherein the dependency visualization comprises a root graphical element that represents the order, a plurality of graphical elements that represent a plurality of components of the order including a first set of graphical elements representing one or more of a physical component and a software component and a second set of graphical elements each representing a service component to be performed for the one or more of the physical component and the software component, respectively, and directional edges between the first set of graphical elements and the second set of graphical elements that represent dependencies among the plurality of components of the order, respectively;
identifying, based on the dependency data of the plurality of components, a first part of the order that has not been completed and a second part of the order that is dependent on completion of the first part of the order; and
rendering the dependency visualization via the user interface, wherein the rendering comprises distinguishing an appearance of a graphical element that corresponds to the second part of the order from the plurality of graphical elements within the dependency visualization based on the identified first part of the order not being completed and being dependent on the identified first part of the order, each rendered graphical element including an inner graphical component and a dynamically configurable outer graphical component surrounding the inner graphical component to indicate the completion status thereof.

10. The method of claim 9, wherein the generating comprises generating each graphical element, from among the plurality of graphical elements, with a same shape and a same size.

11. The method of claim 9, wherein a directional edge between the first and second graphical elements indicates the service component depends on the one or more of the physical component and the software component being installed or that the one or more of the physical component and the software component depend on the service component being performed first.

12. The method of claim 9, wherein the generating the dependency visualization comprises visually differentiating an appearance of a third set of graphical elements that correspond to a part of the order that has been completed from the appearance of the graphical element that corresponds to the first part of the order that has not yet been completed by varying at least one of a shading and a coloring of the outer component of the third set of graphical elements.

13. The method of claim 12, wherein the visually differentiating comprises rendering the outer graphical component as a first color for the first set of graphical elements and a different color for the third set of graphical elements.

14. The method of claim 9, wherein the generating the dependency visualization comprises arranging a first row of graphical elements corresponding to a first group of components in the order that are dependent on each other and arranging a second row of graphical elements corresponding to a second group of components in the order that are dependent on each other.

15. The method of claim 14, further comprising arranging the first row of graphical elements in parallel with and above the second row of graphical elements when the first group of components are independent from the second group of components, and both depend from a same component in the order.

16. The method of claim 9, wherein the generating the dependency visualization comprises generating identical graphical elements for a non-service component in the order and a service component in the order for servicing the non-service component.

17. A method comprising:
retrieving, via an application programming interface (API) of a data store, dependency data of a plurality of components included in an order, the dependency data identifying a dependency between the plurality of components and identifying a completion status for each of the plurality of components;
generating a visualization based on the retrieved dependency data, wherein the visualization comprises a root graphical element that represents the order, a plurality of graphical elements that represent the plurality of components included in the order including a first set of graphical elements representing one or more of a physical component and a software component and a second set of graphical elements each representing a service component to be performed for the one or more of the physical component and the software component, respectively, and directional edges between the first set of graphical elements and the second set of graphical elements that represent dependencies among the plurality of components of the order, respectively;

identifying, based on the dependency data of the plurality of components, a first part of the order that has not been completed and a second part of the order that is dependent on completion of the first part of the order; and rendering the visualization via a user interface, wherein the rendering comprises distinguishing an appearance of a graphical element that corresponds to the second part of the order from the plurality of graphical elements within the dependency visualization based on the identified first part of the order not being completed and being dependent on the identified first part of the order, each rendered graphical element including an inner graphical component and a dynamically configurable outer graphical component surrounding the inner graphical component to indicate the completion status thereof.

18. The method of claim 17, wherein the generating of the visualization comprises visually differentiating an appearance of a third set of graphical elements that correspond to a part of the order that has been completed from the appearance of the graphical element that corresponds to the first part of the order that has not yet been completed by varying at least one of a shading and a coloring of the outer component of the third set of graphical elements.

19. The method of claim 17, wherein the generating of the visualization comprises generating each graphical element, from among the plurality of graphical elements, with a same shape and a same size.

\* \* \* \* \*